United States Patent

[11] 3,581,274

[72] Inventor William H. Ruehle
       Duncanville, Tex.
[21] Appl. No. 808,410
[22] Filed Mar. 19, 1969
[45] Patented May 25, 1971
[73] Assignee Mobil Oil Corporation

[54] FREQUENCY-DOMAIN BAND BROADENING OF SEISMIC DATA
9 Claims, 21 Drawing Figs.

[52] U.S. Cl. .................................................. 340/15.5
[51] Int. Cl. .................................................. G01v 1/00
[50] Field of Search ....................................... 340/15.5
                                        IF, 15.5 AF, 15.5 DP

[56]              References Cited
              UNITED STATES PATENTS
2,696,891  12/1954  Neufeld ......................... 340/15.5
3,274,542   9/1966  Ruehle .......................... 340/15.5
3,292,141  12/1966  Hines et al. .................... 340/15.5

OTHER REFERENCES
Morrison et al: " The Electronic Computer and Geophysics" ; Geophysics, Vol. XXVI, No. 1, (Feb. 61), pp. 40— 44

Primary Examiner—Rodney D. Bennett, Jr.
Assistant Examiner—Joseph G. Baxter
Attorneys—William J. Scherback, Frederick E. Dumoulin, Arthur F. Zobal, Andrew L. Gaboriault and Sidney A. Johnson ABSTRACT: The specification, in the preferred embodiment, discloses a technique for removing distortion such as multiples from seismograms by converting the traces of the seismogram by Fourier transformation into their real and imaginary parts. The envelopes of the real and imaginary parts are detected in the frequency domain and operated on to produce inverse operators which are a function of the envelopes of the real and imaginary parts. The product is formed between the real and imaginary parts of the traces and the inverse operators to remove distortion components from the real and imaginary parts of each trace. The resulting distortion-free data is transformed back into the time domain for further processing and analysis.

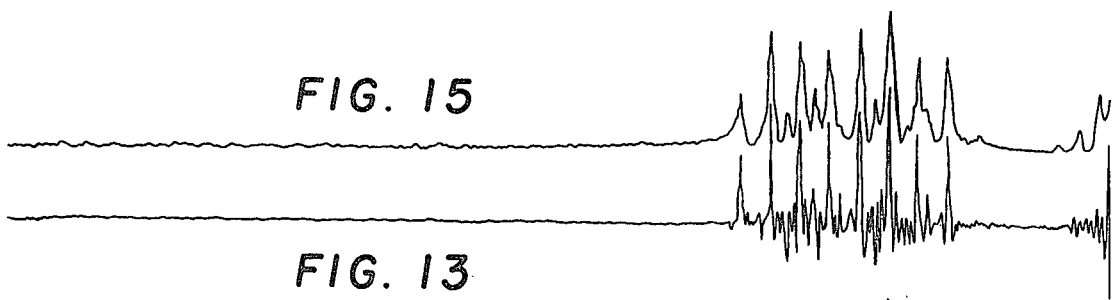
FIG. 15
FIG. 13
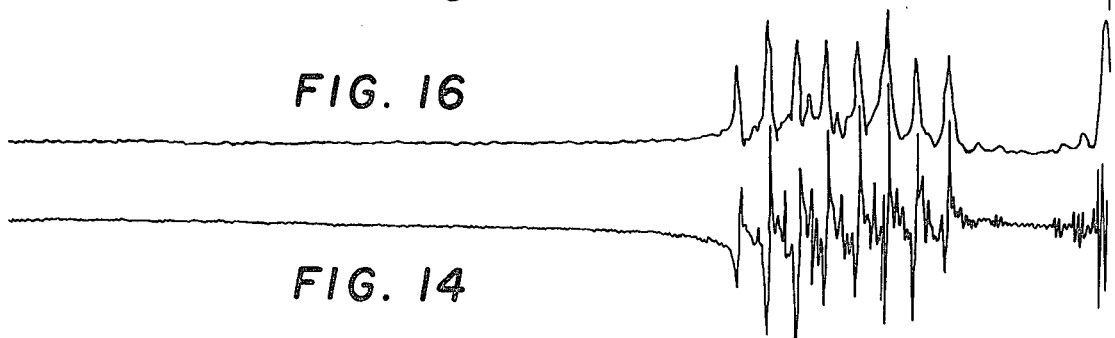
FIG. 16
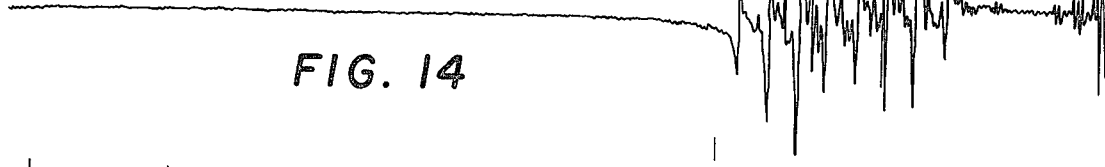
FIG. 14
FIG. 17

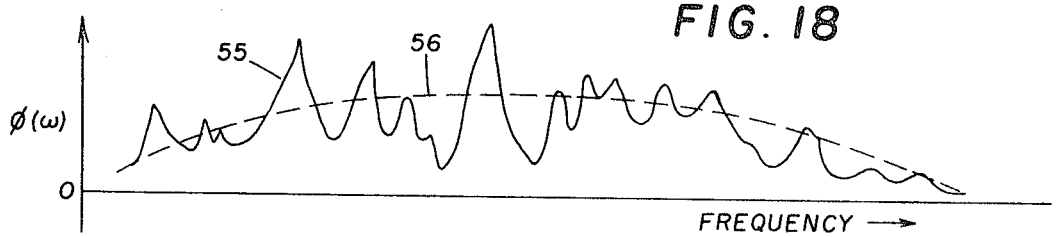
FIG. 18
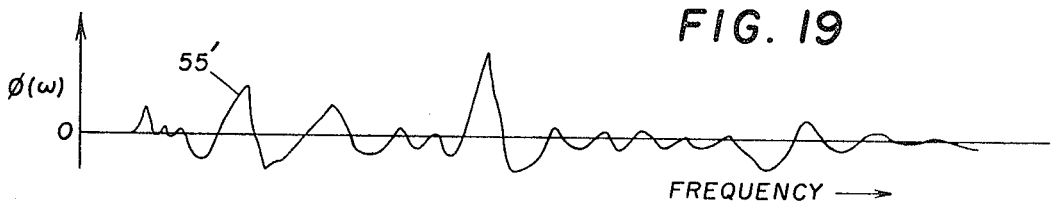
FIG. 19
FIG. 20
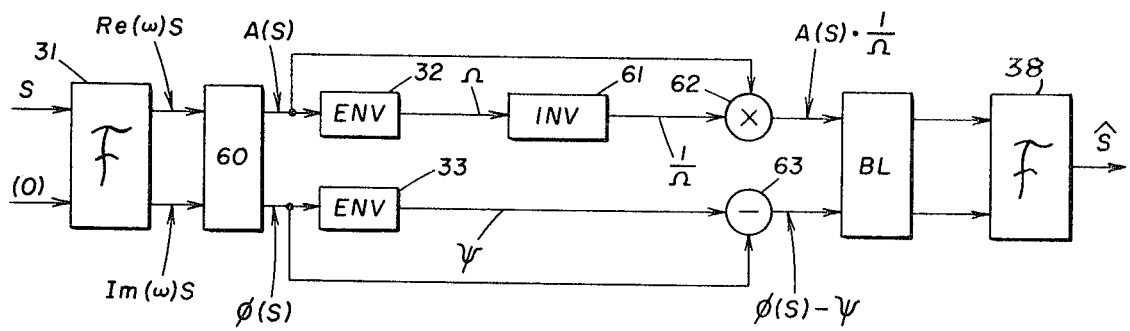
FIG. 21
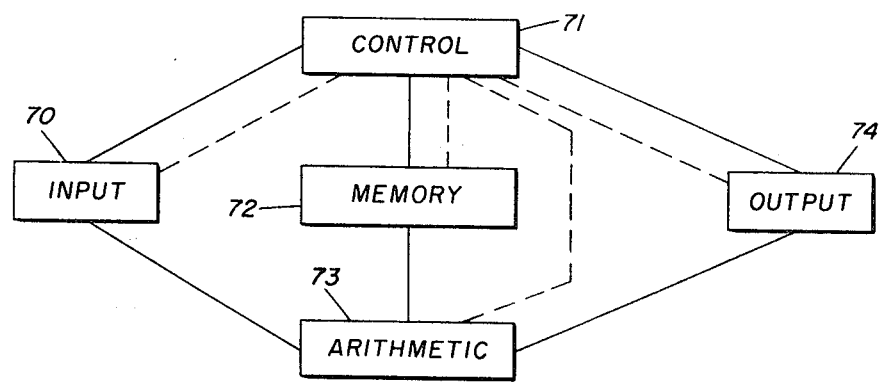

FREQUENCY-DOMAIN BAND BROADENING OF SEISMIC DATA

BACKGROUND OF THE INVENTION

The invention relates to the precessing or geophysical data to remove the effect of distortion such as multiples from the data.

In seismic exploration, geophysical data is obtained by applying acoustic energy to the earth and detecting seismic energy reflected from reflecting interfaces of the subsurface formations. Unfortunately, the data obtained includes distortion such as multiples which often obscures the desired characteristics of the geological formations.

In known processing techniques, multiples have been removed by inverse filtering in the time domain.

SUMMARY OF THE INVENTION

In accordance with the present invention, there is provided a novel, frequency-domain, inverse-filtering technique which has advantages in that it does not require the estimation of distortion operators nor the formation of a statistical model of reflectivity as is required in known time-domain filtering techniques. MOreover, the present technique does not assume a minimum phase and employs all of the complex components of the data such as the imaginary parts and the real parts and hence uses all of the information available. In addition, it can be carried out effectively and rapidly.

The invention stems from studies of the spectrum of seismograms and velocity information wherein it has been observed that the complex spectrum of a seismogram is composed of a reflectivity function and a filter. The shape of this filter is due to the filtering effect of the earth and particularly to distortion such as multiples. In accordance with the present invention, the shape of the filter is found in the frequency domain by envelope detection and is used to correct for the effect of the filter.

In carrying out the technique of the present invention, each trace of a seismogram is separated into its complex components in the frequency domain, and the envelopes of the complex components are detected. From these envelopes there are derived operators which are combined with the complex components of each trace to remove distortion components from the data. The resulting data then is transformed back into the time domain for the production of seismic traces wherein the distortion has been reduced.

In the preferred embodiment, each trace is separated into its real and imaginary parts, and the envelopes of the real and imaginary parts are detected. These envelopes are operated on to produce inverse operators. The complex product is formed between the real and imaginary parts of each trace and the inverse operators to remove distortion components from the real and imaginary parts. The resulting data then is transformed into the time domain for the production of distortion-free seismic traces.

In another embodiment, each trace is separated into its amplitude and phase components, and the envelopes of these components are detected. The desired operators are derived from these envelopes and combined with the amplitude and phase components of each trace to obtain distortion-free data which then is transformed back into the time domain.

BRIEF DESCRIPTION OF THE DRAWINGS

FIGS. 10—17 illustrate other traces useful in understanding the present invention;

FIGS. 18 and 19 illustrate the manner in which phase corrections are obtained;

FIG. 20 is a flow diagram of another embodiment of the present invention; and

FIG. 21 illustrates a general purpose, digital computer for carrying out the processing technique of the present invention.

DESCRIPTION OF THE PREFERRED EMBODIMENTS

Figure 1:
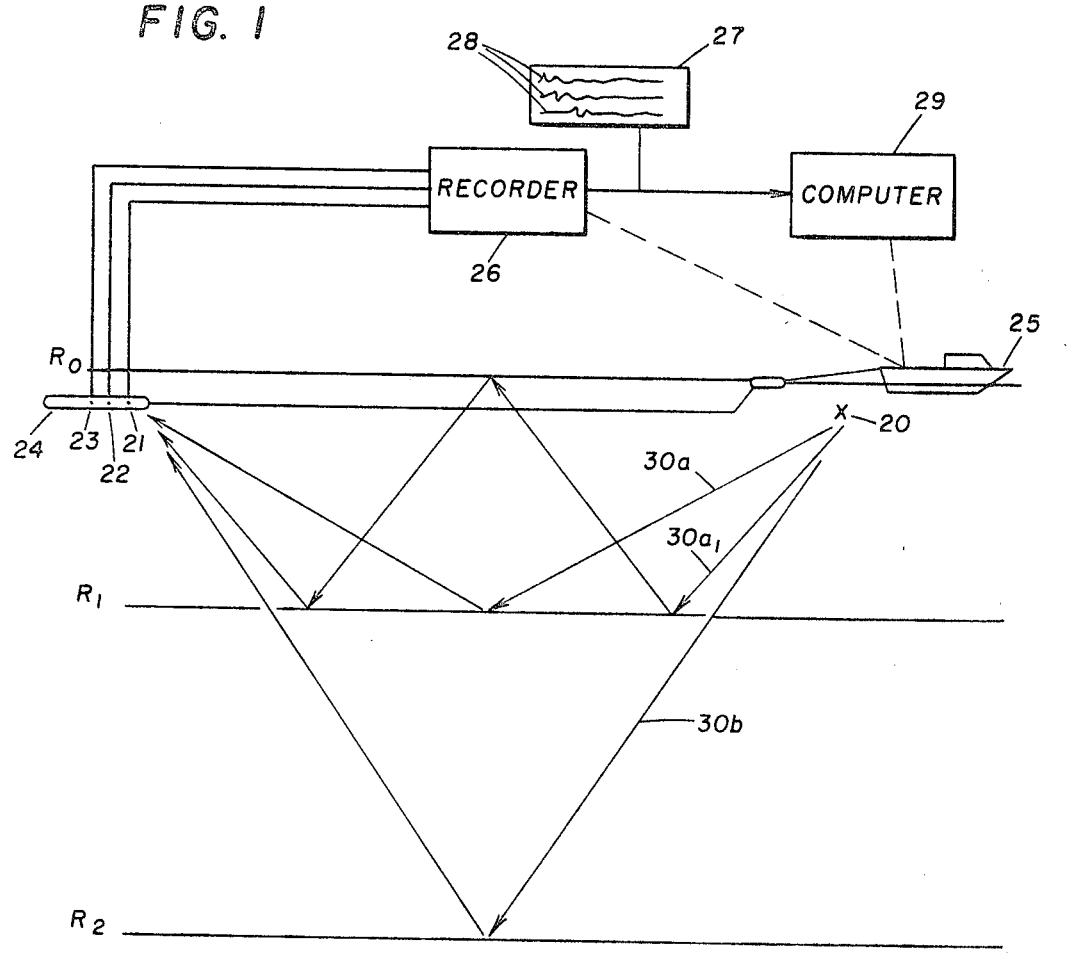
FIG. 1 illustrates a seismic surveying technique.

Methods involved in seismic surveying are well known. Referring to FIG. 1, one method comprises marine seismic surveying operations wherein acoustic impulses are generated in water along a traverse at a plurality of spaced points, one point being illustrated at 20. The resulting seismic waves travel downward, are reflected from interfaces, and detected by a plurality of detectors 21, 22, 23, etc., located in a streamer 24 towed behind a tow vessel 25. The outputs of the detectors are recorded by a recorder 26 to produce a seismogram 27 which consists of a plurality of side-by-side traces 28. The seismogram 27 may be stored and processed later to reduce the effect of multiples, distortion, etc., or may be processed in place by a processor illustrated at 29 located on the tow vessel 25.

Figure 2:
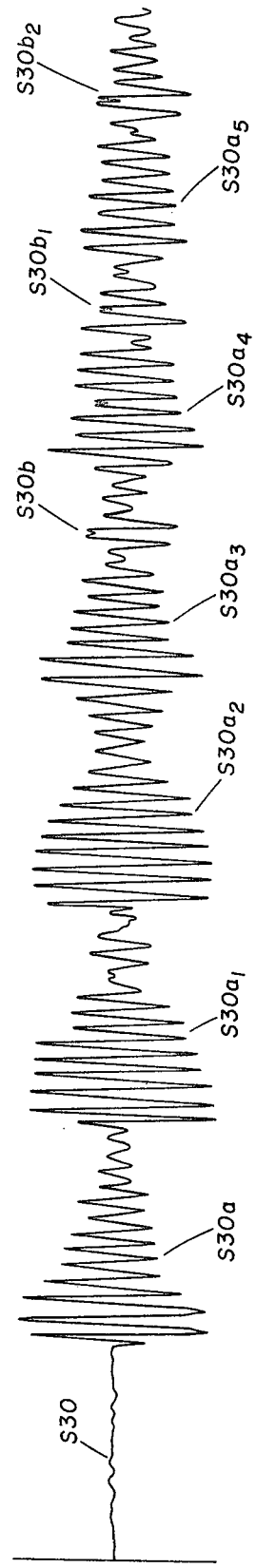
FIG. 2 illustrates a seismic trace in the time domain.

Preferably, traces 28 are recorded in digital form on magnetic tape but will be described, for convenience, as continuous lines having excursions which represent the subsurface reflecting interfaces of interest, multiples, noise, etc. The trace S30 of FIG. 2 represents, in analog form, the output of one of the detectors wherein the abscissa represents time and the ordinate represents amplitude variations. The first set of excursions S30a represents the primary reflection of seismic energy from the ocean bottom $R_1$ and which travels along the path illustrated at 30a in FIG. 1. The excursions $S30a_1$ represent first-order surface multiples from seismic energy reflected from the ocean bottom. The path of these multiples is illustrated at $30a_1$ in FIG. 1. In this FIG. 1, $R_o$ represent the surface of the water. Excursions $S30a_2$—$S30a_5$ represent second-, third-, fourth-, and fifth-order surface multiples from the seismic energy reflected from the ocean bottom. Excursions S30b represent the primary reflection of seismic energy from subsurface interface $R_2$ and which travels along the path 30b as illustrated in FIG. 1. Excursions $S30b_1$ and $S30b_2$ represent first- and second-order surface multiples of seismic energy reflected from interface $R_2$.

DETAILED DESCRIPTION OF THE INVENTION

Figure 3:
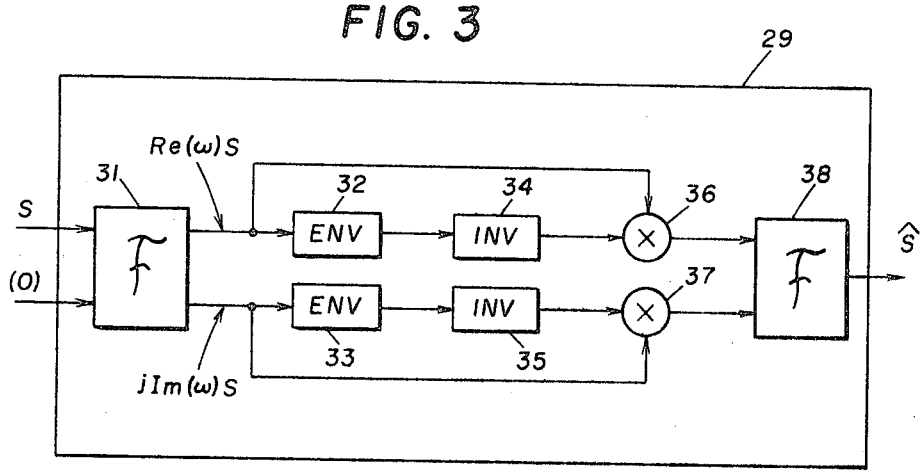
FIG. 3 is a flow diagram of one embodiment of the present invention.

Referring now to FIG. 3, there will be described, in its simplest form, one processing technique of the present invention for removing multiples from a seismogram. In this embodiment, the phase of the distortion is not determined. The processor 29 preferably includes a general purpose digital computer for performing at least part of the operations indicated Each trace S is fed into the processor in the time-domain form. The traces are real functions, the imaginary parts of which are zero. Each trace is transformed into the frequency domain by Fourier transformer 31 and separated into its real $Re(\omega)S$ and imaginary $Im(\omega)S$ parts for operation thereon.

Figure 4:
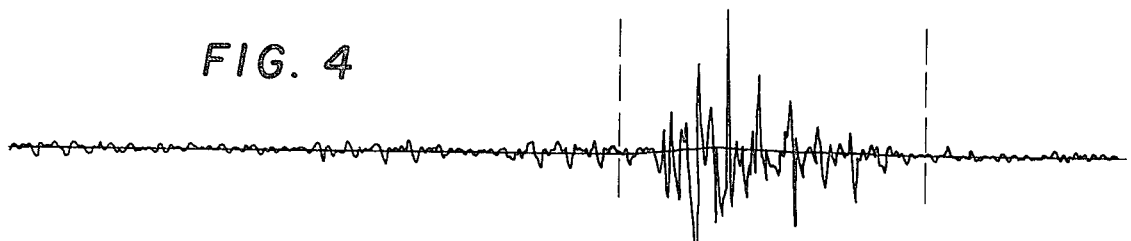
FIGS. 4 and 5 are traces in the frequency domain of the real and imaginary parts of the seismic trace of FIG. 2.
Figure 5:
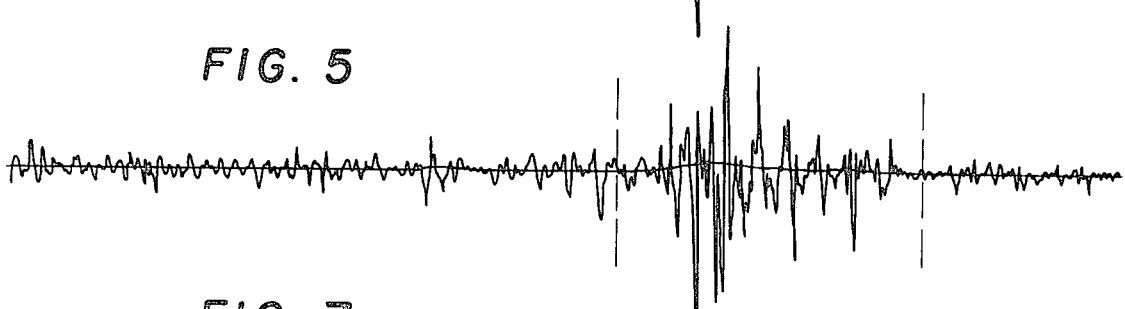

FIGS. 4 and 5 illustrate the real and imaginary parts, respectively, of the trace S30. The strong-peaked oscillations in the seismic frequency range between the dotted lines are due to the effect of distortion such as multiples. The smaller oscillations within the same energy range and hidden between the strong oscillations are due to the primaries of interest. The predominant shape of the real and imaginary parts thus is due to the effect of the distortion.

In the processor of FIG. 3, the shape of the real and imaginary parts of each trace is found, inverted, and applied back to the real and imaginary parts to remove or reduce the effect of the distortion. In this respect, the real part is applied to envelope detector 32 while the imaginary part is applied to envelope detector 33. These detectors detect the envelopes which are inverted at 34 and 35, respectively, for the production of inverse operators or inverted envelopes at their outputs. The complex product is formed at 36 and 37, respectively, between the real and imaginary parts and the inverted envelopes of the real and imaginary parts to remove distortion components from the data. The distortion-free data from units 36 and 37 then is transformed, by transformer 38, into the time domain for the production of the processed seismic traces.

The envelope detectors 32 and 33 may be of the type which operates to form the absolute values of the real and imaginary parts and then filters these values with an operator to form the envelopes. The filtering operation can be an averaging process carried out on the data with an operator comprising samples of the same weights. The averaging process may be defined as the usual convolution process wherein the data is folded, shifted, and multiplied with the operator. The resulting products are added to obtain the desired envelope. The absolute values of the data are found, as indicated above, in order to transform the data into nonnegative numbers in order to prevent cancellation of the data in the subsequent averaging process.

Figure 6:
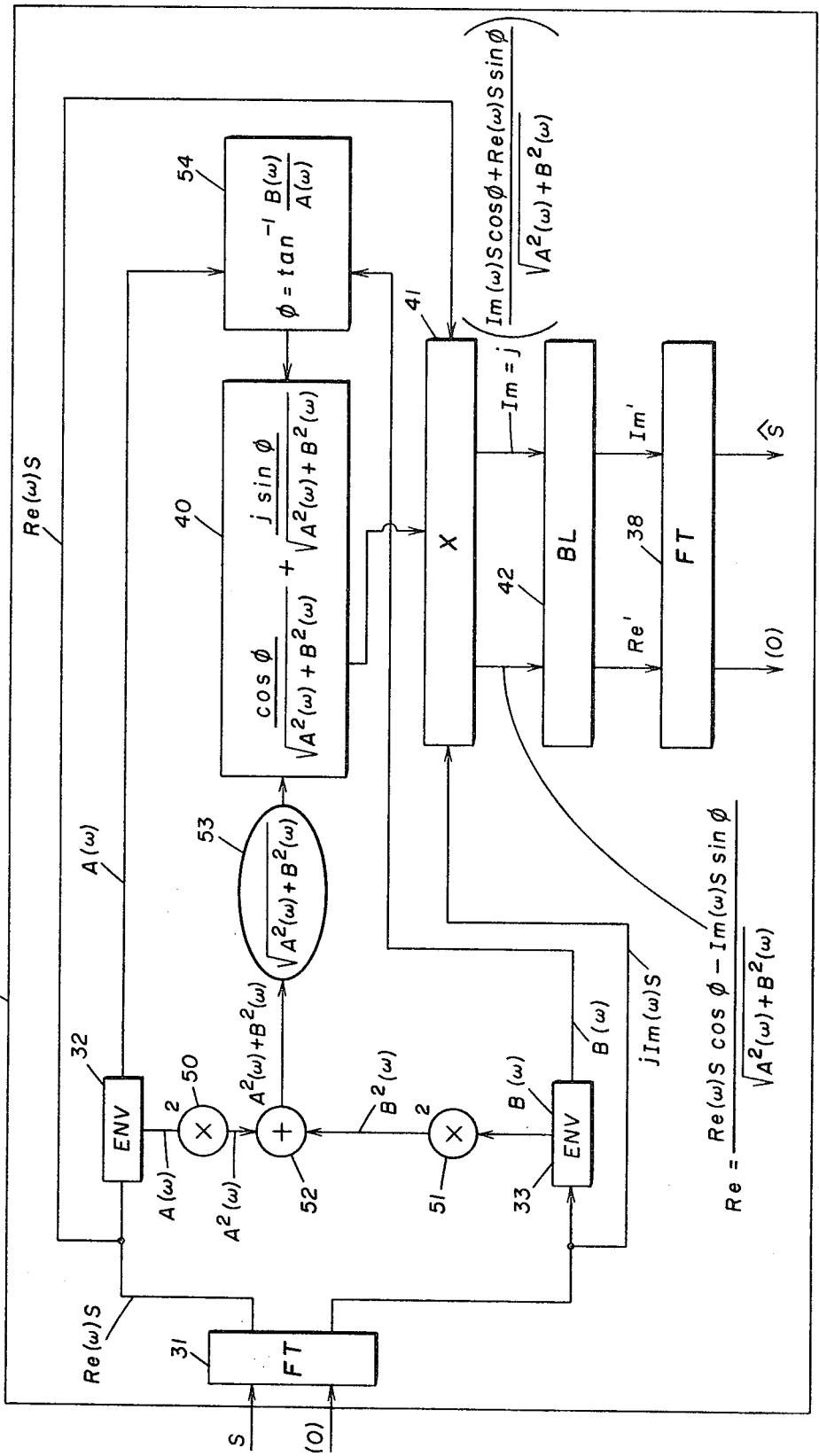
FIG. 6 is a flow diagram of the preferred embodiment of the present invention.

The preferred embodiment for carrying out the present invention is illustrated in FIG. 6. Since some of the components of the processor of FIG. 6 are the same as those of FIG. 3, these components are identified with the same reference characters as used in FIG. 3.

In the embodiment of FIG. 6, the phase of the distortion is determined. The inverse operators, derived from the envelopes of the real and imaginary parts, are produced at 40 and are defined as follows:

$$\frac{\cos \Phi}{\sqrt{A^2(\omega)+B^2(\omega)}} \quad (1)$$

$$\frac{j \sin \Phi}{\sqrt{A^2(\omega)+B^2(\omega)}} \quad (2)$$

wherein:

$A(\omega)$ is the envelope of the absolute value of the real part $Re(\omega)S$;

$B(\omega)$ is the envelope of the absolute value of the imaginary part $Im(\omega)S$;

$$\Phi = \tan^{-1} \frac{B(\omega)}{A(\omega)}; \text{ and}$$

$$j = \sqrt{-1}.$$

Figure 7:
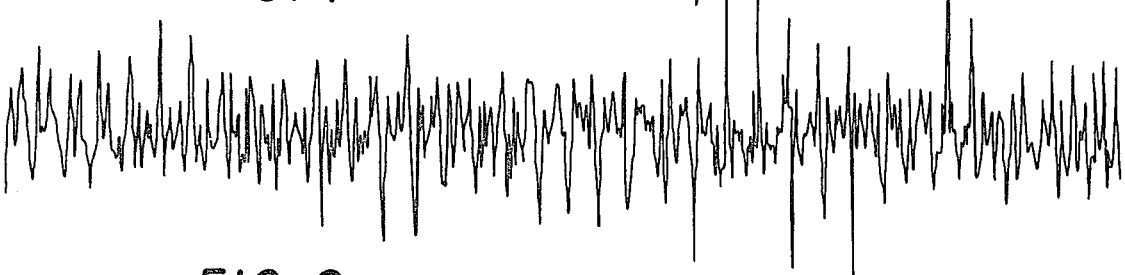
FIGS. 7 and 8 illustrate, in the frequency domain, processed real and imaginary parts of the seismic trace of FIG. 2 as obtained in the preferred embodiment using given envelope detectors.
Figure 8:
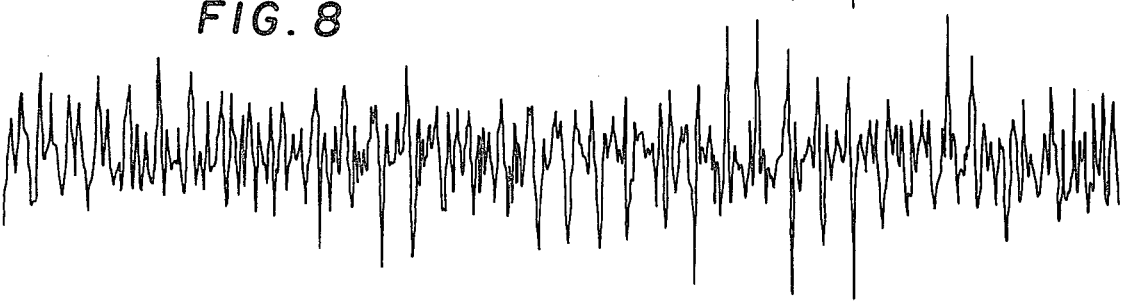

The inverse operators, the real part $Re(\omega)S$, and the imaginary part $Im(\omega)S$ are applied to multiplier 41 wherein a complex multiplication is formed between these terms, thereby removing from the real part and the imaginary part of the seismic trace the effect of their envelopes, respectively, thereby removing multiples from the real and imaginary parts. The resulting real and imaginary outputs from multiplier 41 may be that as illustrated by the traces of FIGS. 7 and 8, respectively. The real part is defined mathematically as:

$$\frac{Re(\omega)S \cos \Phi - Im(\omega)S \sin \Phi}{\sqrt{A^2(\omega)+B^2(\omega)}} \quad (3)$$

while the imaginary part is defined mathematically as:

$$j\left(\frac{Im(\omega)S \cos \Phi + Re(\omega) \sin \Phi}{\sqrt{A^2(\omega)+B^2(\omega)}}\right) \quad (4)$$

The outputs of unit 41 are band-limited at 42 to remove noise at frequencies outside of the desired frequency range. The band-limited outputs then are Fourier transformed at 38 to form a processed seismic trace wherein the effect of multiples and undesired noise has been removed or reduced.

Figure 9:
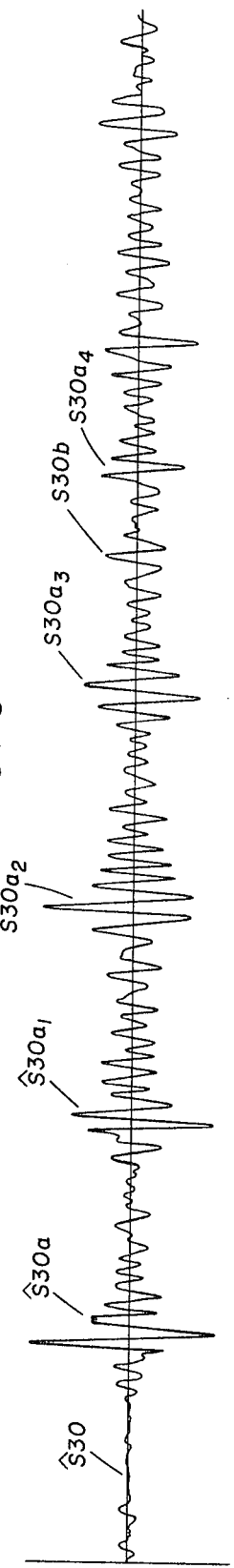
FIG. 9 illustrates a processed seismic trace obtained by transforming the traces of FIGS. 7 and 8 into the time domain.

FIG. 9 illustrates in analog form the processed seismic trace S30 after transformation to the time domain. As can be seen, the multiples have been reduced in amplitude and compressed. Thus, in the time domain, the pulses have been shortened whereby the frequency band has been whitened or broadened. This can be understood from a comparison of FIGS. 7 and 8 with FIGS. 4 and 5, respectively.

Figure 12:
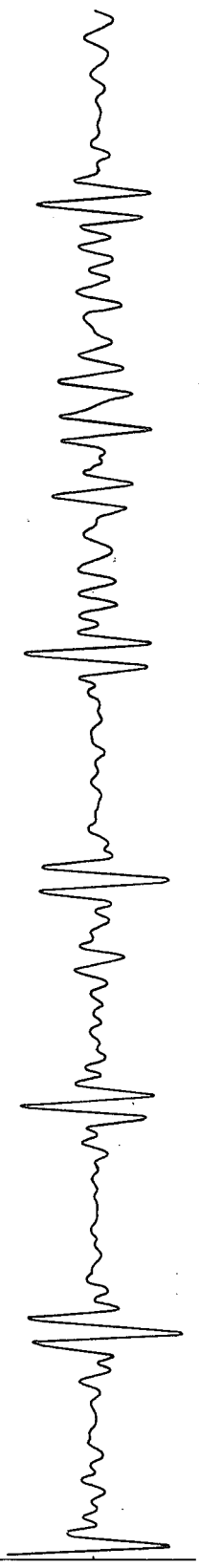
Figure 11:
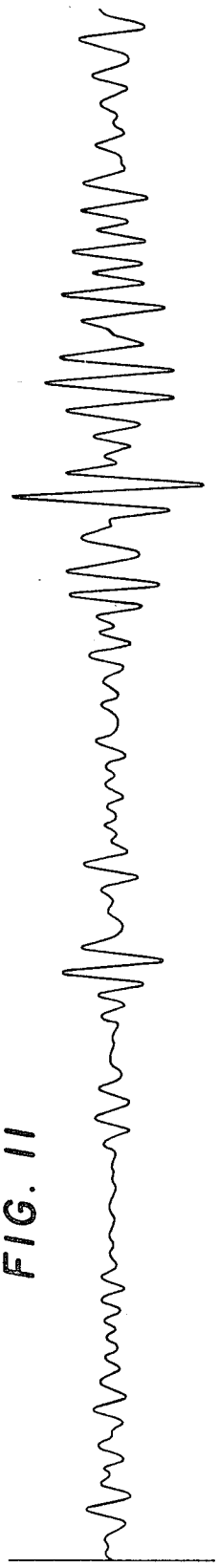
Figure 10:
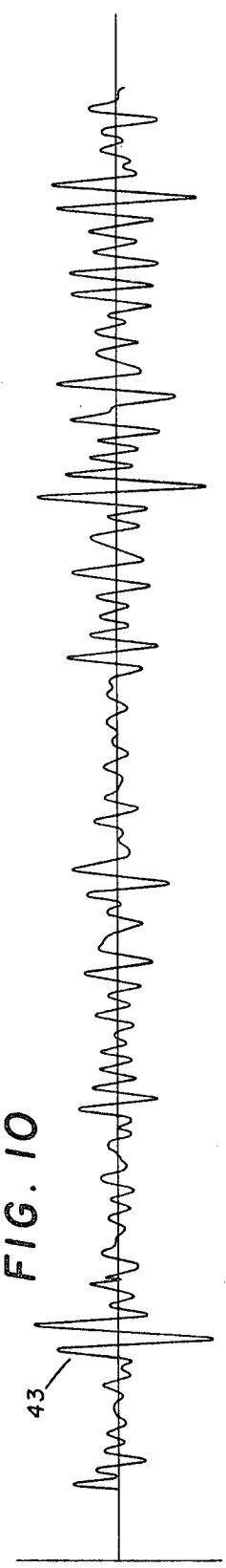

The amount of multiple suppression depends upon the length of the operators or envelope detectors. The envelope detectors used in obtaining the trace of FIG. 9 each was a 21-point operator. For greater multiple suppression, shorter operators are required. In the preferred embodiment, the operators employed for multiple suppression each is a 3-point operator comprising three equally weighted samples. Such an operator allows the fine details of the spectrum of the real and imaginary parts of the trace to be detected whereby increased multiple suppression results. In this respect, the trace of FIG. 10 was obtained from the trace of FIG. 12 by processing with 3-point operators in accordance with the present invention. The trace of FIG. 12 is a synthetic trace obtained by adding multiples to the trace of FIG. 11 which was derived from a velocity log. Thus, the trace of FIG. 11 reflects only primary reflections, whereby the trace of FIG. 12 reflects both primaries and multiples. As can be seen from a comparison of these figures, the multiples have been suppressed and, in effect, compressed back into a single primary reflection which generated them, as illustrated at 43 in FIG. 10.

Referring to FIGS. 13 and 14, the traces shown are the real and imaginary parts, respectively, of the trace of FIG. 12. FIGS. 15 and 16 illustrate the envelopes obtained from the traces of FIGS. 13 and 14, respectively, with 3-point operators. FIG. 17 illustrates the real part of the processed trace of FIG. 10. The trace of FIG. 17 is that obtained before band-limiting. The band of interest is that to the right of the dotted line in FIG. 17. That portion of the trace of FIG. 17 to the left of the dotted line is to be filtered by the band-limiter 42.

There now will be described the manner in which the inverse operators of FIG. 6 are formed. Consider the following mathematical expression:

$$r + ji \quad (5)$$

wherein:

$r$ is the real part, and $i$ is the imaginary part.

Find the inverse of this expression:

$$\frac{1}{r+ji} \quad (6)$$

Multiply $r - ji$ times the numerator and denominator:

$$\frac{r-ji}{r-ji} \times \frac{1}{r+ji} = \frac{r-ji}{r^2+i^2} \quad (7)$$

Further, if one considers the following equation:

$$a + jb = Ae^{j\Phi} \quad (8)$$

wherein:

$$\Phi = \tan^{-1} \frac{a}{b} \quad (9)$$

and $$A = \sqrt{a^2 + b^2} \quad (10)$$

then the right-hand term of Equation (7) may be defined as follows:

$$\frac{r-ji}{r^2+i^2} = \frac{\sqrt{r^2+i^2}}{r^2+i^2} e^{j\Phi} \quad (11)$$

The right-hand term of Equation (11) may be defined as:

$$\frac{1e^{j\Phi}}{\sqrt{r^2+i^2}} = \frac{\cos \Phi}{\sqrt{r^2+i^2}} + \frac{j \sin \Phi}{\sqrt{r^2+i^2}} \quad (12)$$

wherein the right-hand term of Equation (12) defines the general form of the inverse operators.

Referring again to FIG. 6, the operations carried out to obtain the inverse operators comprise squaring operations carried out at 50 and 51 wherein $A(\omega)$ and $B(\omega)$, respectively, are squared. These squared terms are added at 52 and the square root of the resulting sum found at 53. This term is inverted and applied to inverse operator unit 40 to form the denominator of the inverse operators.

The phase of the distortion defining the inverse operators is obtained by applying the output of envelope detectors 32 and 33 to phase-finding unit 54 to determine the phase:

$$\Phi = \tan^{-1} \frac{B(\omega)}{A(\omega)} \quad (13)$$

The output of phase-finding unit 54 in turn is applied to unit 40 to obtain the inverse operators.

In actual operations, it has been found that the phase oscillates about the zero axis. In this connection, the curve 55 of FIG. 18 illustrates the phase curve or spectrum in its positive form. In order to obtain the phase curve shifted to the zero axis, the mean of the positive signal, illustrated at 56 in FIG. 18, is determined and then subtracted from the phase curve 55 to obtain the corrected phase curve 55' illustrated in FIG. 19.

In the embodiments described above, the envelopes of the real and imaginary parts of the traces were found and then operated on to obtain the desired operators for removing the distortion from the real and imaginary parts of the traces. In another embodiment, illustrated in FIG. 20, each trace is separated into its amplitude and phase components and the envelopes of these components are found and employed to correct for the distortion.

In the flow diagram of FIG. 20, certain components are the same as those described previously. In this flow diagram, a seismic trace S to be processed is applied to Fourier transformer 31 which transforms the trace into its real $Re(\omega)S$ and imaginary $Im(\omega)S$ parts. These components are applied to unit 60 which derives the amplitude $A(S)$ and phase $\Phi(S)$ components of the seismic trace. These amplitude and phase components are defined as follows, respectively:

$$A(S) = \sqrt{[Re(\omega)S]^2 + [Im(\omega)S]^2} \quad (15)$$
$$\Phi(S) = \tan^{-1} Im(\omega)S/Re(\omega)S \quad (16)$$

The amplitude and phase components are applied to envelope detectors 32 and 33 which form the envelopes $\Omega$ and $\psi$ of the amplitude and phase components, respectively. In this respect, the detectors determine the absolute values of the amplitude and phase components and convolve these components with the desired filter operators. In the embodiments of FIG. 20, the filter operator used in detector 33 generally has a length longer than that used in the detector 32.

The output of envelope detector 32 is applied to inverted 61 for the production of an output $1/\Omega$ which is the inverse of the envelope of the amplitude component. The output of unit 61 and the amplitude component $A(S)$ are applied to unit 62 which forms the product $A(S) \times 1/\Omega$ to remove distortion from the amplitude component. The output of envelope detector 33 is applied to unit 63 where the difference is obtained between the envelope $\psi$ and the phase component $\Phi(S)$ to remove distortion from the phase component of the seismic trace. In order to obtain the difference, the output of envelope detector 33 may be subtracted from the phase component or its sign may be changed and added to the phase component. In this respect, unit 63 may be a subtract or add unit.

The outputs of units 62 and 63 are band-limited at 42 and then applied to Fourier transformer 38 to transform the corrected data to the time domain for the production of a processed seismic trace free from the unwanted distortion.

In the embodiment of FIG. 20, conventional techniques may be used to determine the phase of the seismic trace and its sign may be followed throughout the computation so that the phase can be defined continuously in the range $0 \rightarrow 2\pi$.

As indicated above, the processing of the seismic traces preferably is carried out with a processor or machine including a general-purpose, digital computer. A suitable computer is a 1604 Computer manufactured by CDC. This computer can be programmed by those skilled in the art to carry out the invention as described above.

In one embodiment, the computer may be programmed to carry out the Fourier transformations at 31 and 38. In another embodiment, a Fourier transformer, available commercially in the industry, may be coupled to the front of the computer for transforming the data into the real and imaginary parts before it is fed into the computer. The use of such a transformer has advantages since it allows faster processing. In this respect, the automatic transformation in place takes no more time than normal operations of bringing data into the computer. A suitable online transformer is described in an article entitled "The time-saver: FFT hardware," by Richard Klahn et al., appearing in ELECTRONICS, June 24, 1968, pages 92—97. An online Fourier transformer also may be coupled to the output of the computer for transforming the processed data from the frequency domain to the time domain.

A block diagram of a general-purpose computer is illustrated in FIG. 21 wherein the solid lines indicate the transfer, between the various units of the computer, of information applied to the computer by the operator. The primary computer units are identified as input 70, control 71, memory 72, arithmetic 73, and output 74. The dotted lines indicate the internal control lines between the control unit and the other units necessary to achieve the desired operations.

The seismic data and the program are fed into the memory from the input. Only the program goes to the control unit. In one embodiment, the program is punched in cards and transferred to the computer by a card reader. The seismic data fed into the computer is in digital form on magnetic tape.

Although the invention in one embodiment was illustrated as being applicable to data obtained from marine seismic operations, it is to be understood that the invention also is applicable to data obtained from land surveying operations.

I claim:

1. A process automatically performed in a data processing machine for reducing the effect of distortion from a seismogram comprising a plurality of traces representative of seismic energy detected at a plurality of spaced positions obtained in seismic surveying operations, comprising the steps of, in said data processing machine:

separating each trace into its complex components, forming distortion-removal functions which are a function of the envelopes of said complex components, combining said distortion-removal functions with said complex components to remove distortion components from said complex components for the production of data in the frequency domain wherein said distortion components have been removed, and transforming said data into the time domain for the production of seismic traces wherein the effect of said distortion has been reduced.

2. A method of reducing the effect of distortion from a seismogram comprising a plurality of traces representative of seismic energy detected at a plurality of spaced positions obtained in seismic surveying operations, comprising the steps of, in an automatic data processing system:

separating each trace into its complex components in the frequency domain, detecting the envelopes of said complex components to detect distortion components in said complex components, deriving from said envelopes, operators which, when combined with said complex components, remove said distortion components therefrom, combining said operators with said complex components to remove said distortion components from said complex components for the production of data in the frequency domain wherein said distortion components have been removed, and transforming said data into the time domain for the production of seismic traces wherein the effect of said distortion has been reduced.

3. A method of reducing the effect of distortion from a seismogram comprising a plurality of traces representative of seismic energy detected at a plurality of spaced positions obtained in seismic surveying operations, comprising the steps of, in an automatic data processing system:

separating each trace by Fourier transformation into its real and imaginary parts, detecting the envelopes of said real and imaginary parts, operating on said envelopes of said real and imaginary parts to produce inverse operators which are a function of said envelopes of said real and imaginary parts, forming the complex product between said real and imaginary parts and said inverse operators to remove distortion components from said real and imaginary parts for the production of data in the frequency domain wherein said distortion components have been removed, and transforming said data into the time domain for the production of seismic traces wherein the effect of said distortion has been reduced.

4. The method of claim 3 wherein:

said operations are carried out with a Fourier transformer and a digital computer, and Fourier transformer being coupled to said computer to carry out said Fourier transformation.

5. A method of reducing the effect of distortion from a seismogram comprising a plurality of traces representative of seismic energy detected at a plurality of spaced positions obtained in seismic surveying operations, comprising the steps of, in an automatic data processing system:

separating each trace into its amplitude and phase components in the frequency domain, detecting the envelopes of said amplitude and phase components to detect distortion components, forming the inverse of said envelope detected from said amplitude component, forming the product between said inverse and said amplitude component for the production of data in the frequency domain wherein distortion components have been removed, forming the difference between said phase component and said envelope detected from said phase component for the production of data in the frequency domain wherein said distortion components have been removed, and transforming said data into the time domain for the production of seismic traces wherein the effect of said distortion has been reduced.

6. A method of reducing the effect of distortion from a seismogram comprising a plurality of traces in the time domain representative of seismic energy detected at a plurality of spaced positions obtained in seismic surveying operations, comprising the steps of, in an automatic data processing system:

separating each trace by Fourier transformation into its real part Re and its imaginary part Im, detecting the envelopes $A(\omega)$ and $B(\omega)$ of said real and imaginary parts, respectively, operating on said envelope of said real and imaginary parts to produce inverse operators, $$\frac{\cos \Phi}{\sqrt{A(\omega)^2 + B(\omega)^2}} + \frac{i \sin \Phi}{\sqrt{A(\omega)^2 + B(\omega)^2}}$$

which are a function of said real and imaginary parts, wherein:

$j = \sqrt{-1}$ and $\Phi = \tan^{-1} \frac{B(\omega)}{A(\omega)}$ forming the complex product $$(Re + jIm)\left(\frac{\cos \Phi + j \sin \Phi}{\sqrt{A(\omega)^2 + B(\omega)^2}}\right)$$

to remove distortion components from said real and imaginary parts of each trace for the production of data in the frequency domain wherein said distortion components have been removed, and transferring said data into the time domain for the production of seismic traces wherein the effect of said distortion has been reduced.

7. A method of carrying out marine seismic operations employing a tow vessel for towing a detector system and a data processor located on said tow vessel, comprising the steps of:

generating seismic impulses in water for the application of seismic energy to the earth, detecting in water reflected seismic energy, on said tow vessel, producing a seismogram from said detecting operations and comprising a plurality of traces in the time domain representative of seismic energy detected, on said tow vessel, processing said seismogram in an automatic data processing system by carrying out the following steps:

separating each trace by Fourier transformation into its real and imaginary parts, detecting the envelopes of said real and imaginary parts and due to unwanted distortion, operating on said envelopes of said real and imaginary parts to produce inverse operators which are a function of said envelopes of said real and imaginary parts, combining said inverse operators with said real and imaginary parts to remove distortion components from said real and imaginary parts for the production of data in the frequency domain wherein said distortion components have been removed, and transforming said data into the time domain for the production of seismic traces wherein the effect of said distortion has been reduced.

8. The method of claim 7 wherein:

said operations are carried out with a Fourier transformer and a digital computer, said Fourier transformer being coupled to said computer to carry out said Fourier transformation.

9. An automatic data processing machine programmed to reduce the effect of distortion from a seismogram comprising a plurality of traces representative of seismic energy detected at a plurality of spaced positions obtained in seismic surveying operations, said data processing machine being programmed to include:

means for separating each trace by Fourier transformation into its real and imaginary parts, means for detecting the envelopes of said real and imaginary parts, means for operating on said envelopes of said real and imaginary parts to produce inverse operators which are a function of said envelopes of said real and imaginary parts, means for forming the complex product between said real and imaginary parts and said inverse operators to remove distortion components from said real and imaginary parts for the production of data in the frequency domain wherein said distortion components have been removed, and means for transforming said data into the time domain for the production of seismic traces wherein the effect of said distortion has been reduced.

PO-1050
(5/69)

UNITED STATES PATENT OFFICE
CERTIFICATE OF CORRECTION

Patent No. 3,581,274            Dated May 25, 1971

Inventor(s) William H. Ruehle

It is certified that error appears in the above-identified patent and that said Letters Patent are hereby corrected as shown below:

Column 1, line 5, "precessing or" should read --processing of--; line 24, "MOreover" should read --Moreover--. Column 2, lines 58 and 59, after the word "indicated" insert a period (.). Column 3, lines 74 and 75, that portion of Equation (4) reading $\underline{Im(\omega)S \cos \Phi + Re(\omega) \sin \Phi}$ should read $\underline{Im(\omega)S \cos \Phi + Re(\omega)S \sin \Phi}$ Column 4, lines 8 and 9, after "compressed" cancel the comma (,) and insert a period (.). Column 4, lines 63 and 64, Equation (9) should appear as follows:

$$\Phi = \tan^{-1} \frac{b}{a} \quad\quad (9)$$

Column 5, line 43, that portion of Equation (16) reading $\Phi(S) = \tan^{11}$     should read     $\Phi(S) = \tan^{-1}$ Column 5, line 50, "embodiments" should read --embodiment--; line 53, "inverted 61" should read --inverter 61--. Column 7, line 23, "and" should read --said--; line 58, "envelope" should read --envelopes--. Column 7, lines 60 to 65, that portion of the equation reading $\underline{i \sin \Phi}$        should read        $\underline{j \sin \Phi}$ Column 8, lines 1 to 3, the equation should read $$\Phi = \tan^{-1} \frac{B(\omega)}{A(\omega)}$$

Column 8, line 12, "transferring" should read --transforming--.

Signed and sealed this 26th day of October 1971.

(SEAL)
Attest:

EDWARD M. FLETCHER, JR.          ROBERT GOTTSCHALK
Attesting Officer                    Acting Commissioner of Patents